Nov. 16, 1965 J. L. D. MORRISON ETAL 3,218,077

METHOD AND APPARATUS FOR RECORDING AND REPRODUCING FROM A MAGNETIC SHEET

Filed Jan. 25, 1963 4 Sheets-Sheet 1

INVENTORS
James L. D. Morrison &
Michael H. Estkowski
By Brown, Jackson, Boettcher & Dienner
Att'ys.

Nov. 16, 1965 J. L. D. MORRISON ETAL 3,218,077

METHOD AND APPARATUS FOR RECORDING AND REPRODUCING FROM A MAGNETIC SHEET

Filed Jan. 25, 1963 4 Sheets-Sheet 2

INVENTORS
James L. D. Morrison &
Michael H. Estkowski
By Brown, Jackson, Boettcher & Dienner
Attys.

INVENTORS
James L. D. Morrison &
Michael H. Estkowski
By Brown, Jackson, Boettcher & Dienner
Att'ys.

INVENTORS
James L. D. Morrison &
Michael H. Estkowski
By Brown, Jackson, Boettcher & Dienner
Att'ys.

United States Patent Office 3,218,077

Patented Nov. 16, 1965

3,218,077

METHOD AND APPARATUS FOR RECORDING AND REPRODUCING FROM A MAGNETIC SHEET

James L. D. Morrison, Los Angeles, Calif., and Michael H. Estkowski, St. Joseph, Mich.; said Estkowski assignor to V-M Corporation, Benton Harbor, Mich., a corporation of Michigan Filed Jan. 25, 1963, Ser. No. 253,894
19 Claims. (Cl. 274—4)

The present invention relates to magnetic recording and reproducing apparatus for use with a recording medium which comprises a sheet on which a sound track may be recorded, the sheet normally being flat and being adapted to be wrapped about a movable sheet-mounting member when it is desired to record thereon or reproduce therefrom.

Conventional magnetic recording and reproducing apparatus is adapted for use with a magnetic medium in the form of a tape. The tape normally is stored on a reel and is played on a machine adapted to pass the tape over a magnetic recording or reproducing head and store the tape on a second reel. After the tape has been recorded or reproduced, the machine is adapted to rewind the tape on its original storage reel for subsequent playing.

Because of the fact that reels of tape are relatively difficult to store as compared with disc records, mechanisms have not been developed for continuously and automatically playing one tape after another as is conventional in connection with the playing of disc records. Accordingly, it is necessary in conventional tape recorders and reproducers to manually shift reels of tape after the playing thereof. Thus, the total length of automatic playing time is determined by the total time required for the playing of one reel of tape.

Magnetic recording and reproducing apparatus has heretofore been proposed for utilizing a magnetic recording and reproducing medium in the form of a sheet. The sheet may be attached to a drum with the ends of the sheet overlapping one another, or with the ends of the sheet spaced apart so as to form a gap therebetween, and the drum may be rotated in association with a magnetic recorder-reproducer head for recording and reproducing sound. Apparatus of the foregoing type is conventionally used only for recording and reproducing dictated matter and is not normally used for recording and reproducing music because it has not satisfied the sound reproducing quality requirements for phonographs. For example, no means is provided in machines of this type for preventing an audible "click" when the recorder or reproducer head crosses the junction of the ends of the magnetic medium, although such an audible click would be unacceptable in apparatus utilized for reproducing music.

One possible procedure for eliminating the customary overlapping of the ends of the sheet, or the gap therebetween, is to manufacture the sheet and the drum or sheet-carrying member on which it is wrapped to such close tolerances that when the sheet is applied to the drum the ends of the sheet will meet in a perfect junction without any overlap or gap. However, in such a case the accuracy required with respect to the length of the sheets and the dimensions of the drum or the like on which the sheet is mounted is so critical that the cost of manufacture within such close tolerances renders such a recording and reproducing system impractical for general use.

Accordingly, it is an object of the present invention to provide a method for recording and reproducing from a magnetic medium in the form of a sheet which method will permit the use of sheets of a length which need not be held to close tolerances, and yet will eliminate overlapping of the ends of the sheet and will substantially eliminate a gap therebetween.

A more specific object of the invention is to provide a method as last above-mentioned wherein a magnetic medium in the form of a sheet is dimensiond so as to be of a length at least as great or greater than the periphery of the member on which the sheet is mounted and wherein the ends of the sheet are held in substantially butted relationship during a recording or reproducing operation.

A further object of the invention is to provide apparatus for carrying out the foregoing method comprising a movable sheet-mounting member for mounting a magnetic medium in the form of a sheet, with sheet-positioning members such as sprocket teeth or pins or the like formed on the movable mounting member and adapted to project through corresponding apertures in a sheet which is wrapped on the movable member for the purpose of holding the ends of the sheet in substantially butted relation.

Other advantages and uses of our invention will be apparent, or become so, as we describe the invention in greater detail in conjunction with the accompanying drawings in which.

Figure 3:
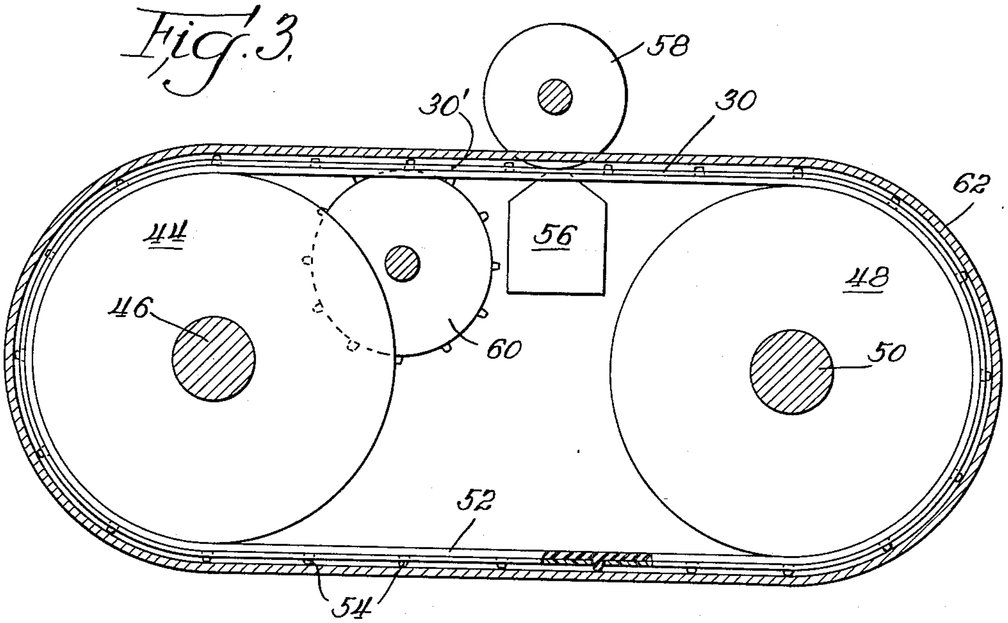
Figure 4:
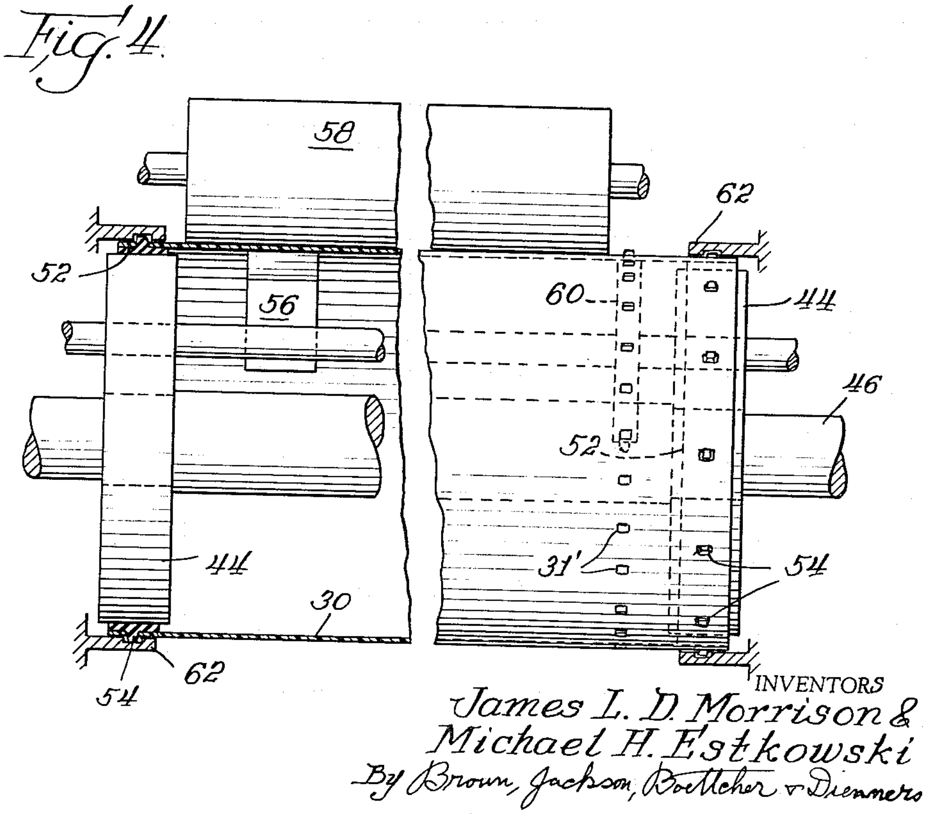
Figure 5:
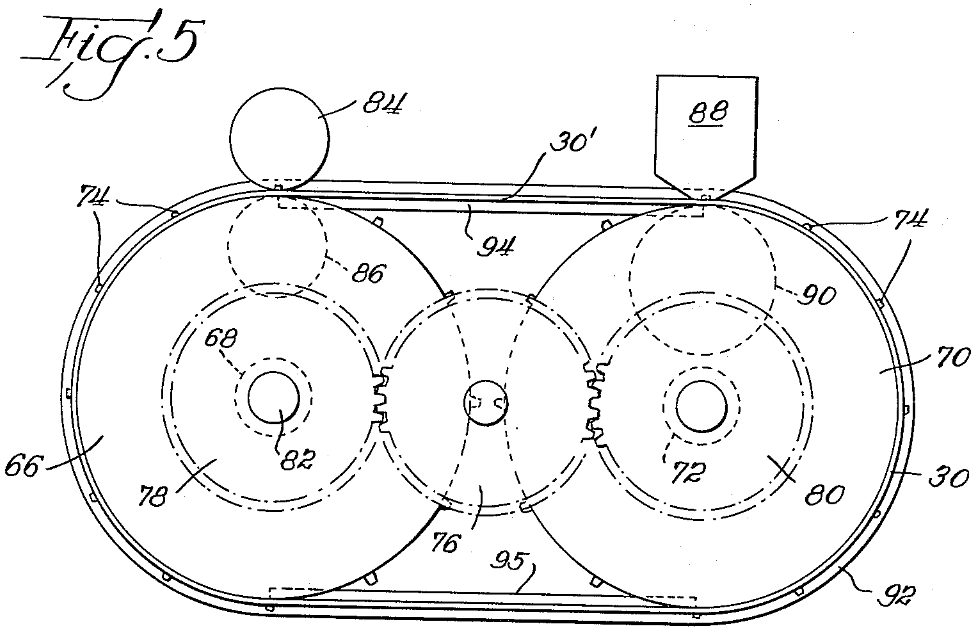
Figure 6:
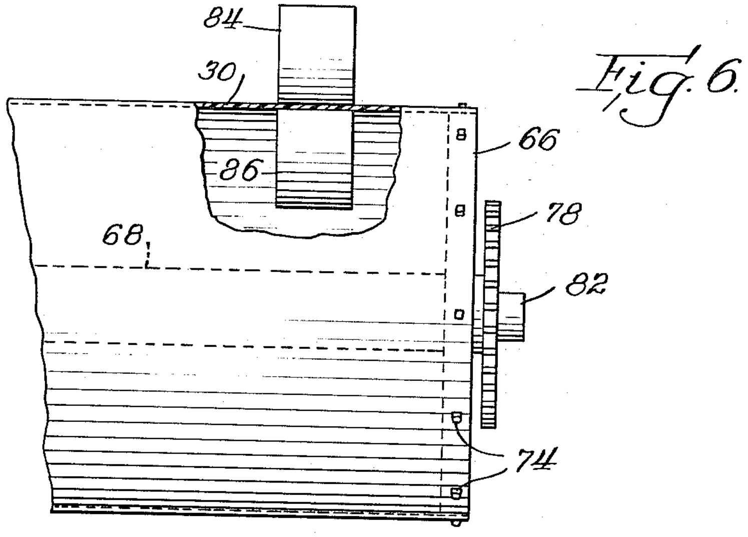
Figures 7, 8:
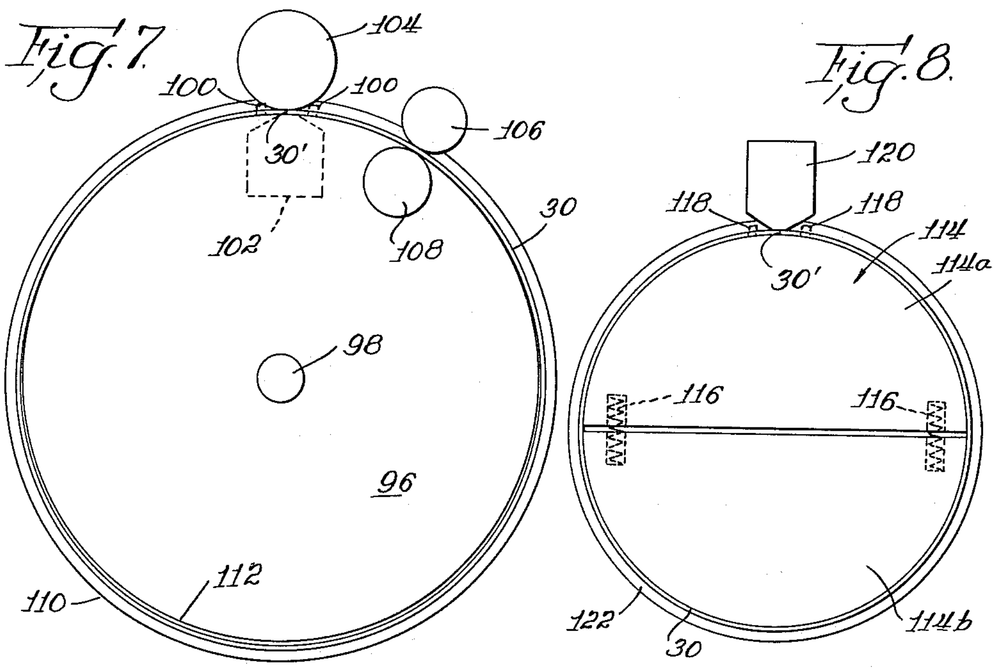
Figure 9:
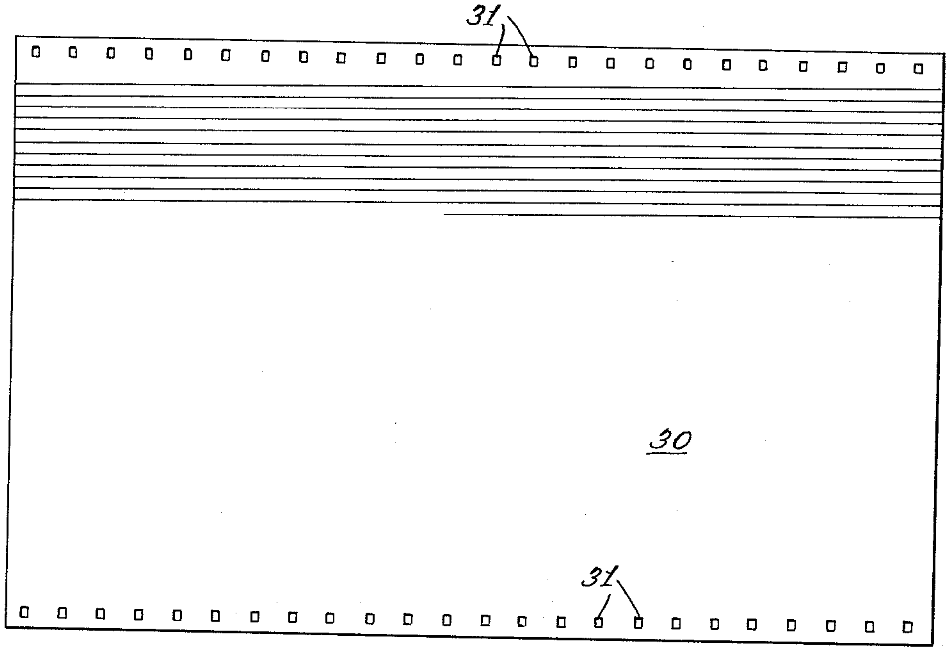

FIGURE 3 is a transverse sectional view illustrating an alternative embodiment of the invention wherein a pair of endless belts having sprocket teeth or the like formed thereon are mounted respectively on two pairs of aligned belt retainer wheels so as to be driven thereby, and wherein a magnetic medium in the form of a sheet is wrapped on the belts with the ends of the sheet held in substantially butted relation by the sheet-positioning sprocket teeth;

FIGURE 4 is a fragmentary side elevational view of the apparatus of FIGURE 3;

FIGURE 5 is a transverse sectional view illustrating a further embodiment of the invention wherein a sheet-mounting member comprises two pairs of relatively small diameter sprocket wheels having sheet-positioning teeth thereon which are synchronized by means of interconnecting drive means, and a magnetic sheet is wrapped around the pairs of sprocket wheels with the ends of the sheet held in substantially butted relation by the sprocket teeth;

FIGURE 6 is a fragmentary side elevational view of the apparatus of FIGURE 5;

FIGURE 7 is a transverse sectional view of a further embodiment of the invention wherein a sheet-mounting member comprises two axially aligned sprocket wheels each af which has two sheet-positioning sprocket teeth thereon so as to permit a magnetic sheet to be wrapped around the sprocket wheels with the ends of the sheet held in substantially butted relation by the teeth, and wherein the sheet is pulled past a recording and reproducing head by a friction drive roller adapted to engage the sheet;

FIGURE 8 is a transverse sectional view of still another modified form of the invention wherein a magnetic medium in the form of a sheet is mounted on an expandable drum having a pair of adjacent sprocket teeth at each end thereof for holding the ends of the sheet in substantially butted relation, the sheet-mounting drum being expandable to take up any slack in the sheet and being rotatable to move the sheet past an associated recording or reproducing head; and FIGURE 9 is a plan view of one form of magnetic sheet which may be used in conjunction with the apparatus of this invention, it being understood that the number of sprocket holes formed in the sheet depends upon the particular form of apparatus with which it is to be used.

Figure 1:
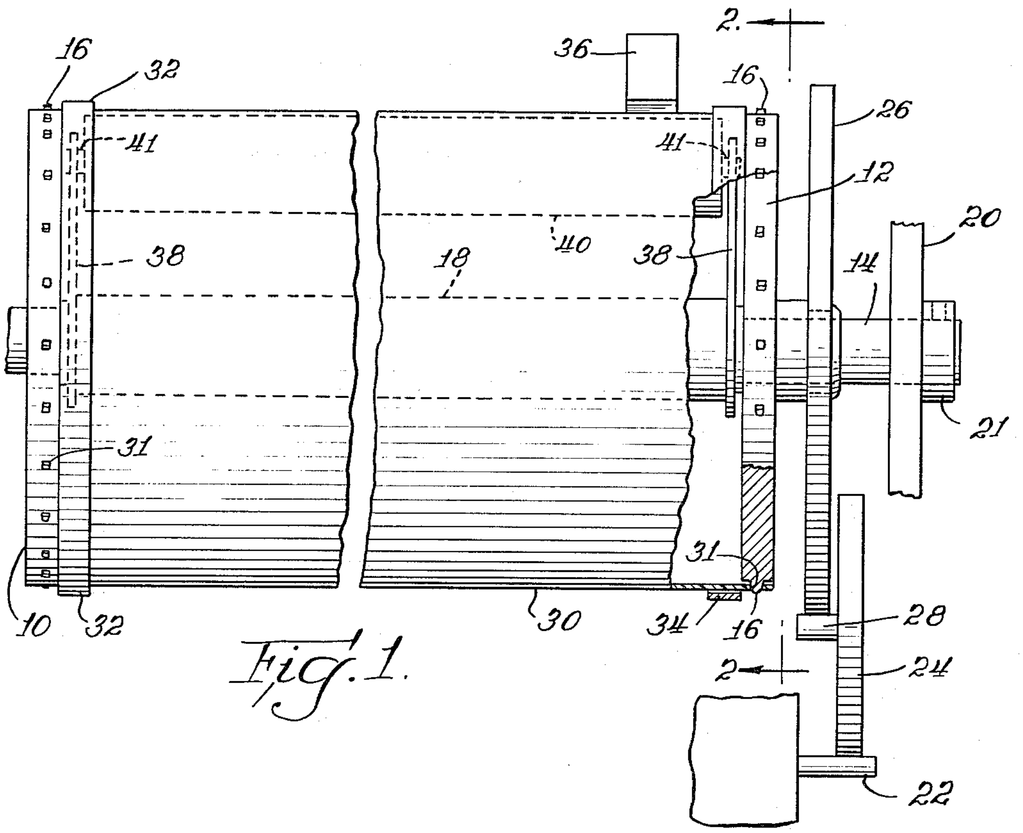
FIGURE 1 is a side elevational view of a recording and reproducing apparatus, constructed in accordance with the present invention, including a sheet-mounting member comprising a pair of sprocket wheels on which a magnetic sheet is wrapped with the ends of the sheet being held in substantially butted relation by sheet-positioning sprocket teeth formed on the wheels.
Figure 2:
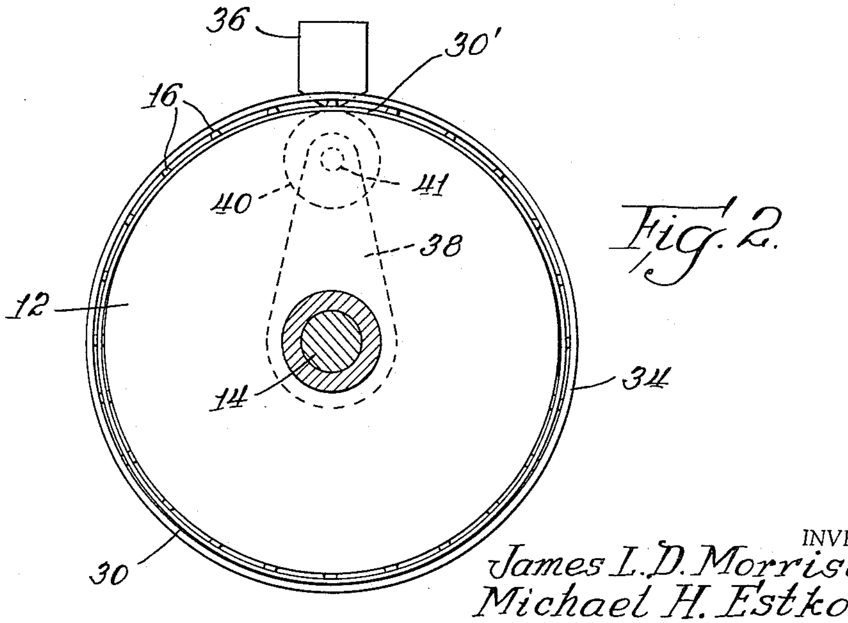
FIGURE 2 is a transverse section taken substantially along the line 2—2 of FIGURE 1.

Referring now to the drawings, FIGURES 1 and 2 show a sheet-mounting member comprising a pair of sprocket wheels 10 and 12 which are fixedly mounted on a shaft 14 for rotation therewith. Each of the wheels 10 and 12 is provided with a plurality of sheet-positioning sprocket teeth 16 at spaced intervals around the circumference thereof, in this instance there being 24 equally spaced teeth provided on each of the sprocket wheels. The shaft 14 extends through a fixed tubular housing member 18, and one end of the shaft is journalled in a body or frame member 20 and axially braced thereagainst by a locknut 21.

A motor driven shaft indicated at 22 serves to drive the sprocket wheel assembly through an idler pulley 24 and a drive wheel 26. The drive wheel 26 is keyed or otherwise fixedly mounted on the shaft 14 and is adapted to be engaged at its periphery by a reduced diameter pulley 28 which is integral with the idler pulley 24. It will thus be seen that when the idler pulley is in its operative position with the large diameter pulley portion 24 in engagement with the motor shaft 22 and the small diameter portion 28 in engagement with the drive wheel 26, the motor shaft will serve to rotate the shaft 14 and the sprocket wheels 10 and 12.

In accordance with the present invention, a magnetic medium in the form of a sheet 30 (see FIGURE 9) having two rows of sprocket holes 31 is wrapped around the sprocket wheels 10 and 12 and thereby mounted on the sprocket teeth 16 in such a manner that the ends of the sheet are substantially butted against one another as shown at 30'. It is an important feature of the present invention that the sprocket teeth 16 are utilized to butt the ends of the sheet 30 even though the length of the sheet will normally not be precisely equal to the circumference of the sprocket wheels. The minimum length of the sheet 30 must be at least as great as the circumference of the sprocket wheels if the ends of the sheet are to be butted, but with the present invention the length of the sheet may exceed the circumference of the wheels without producing any overlapping of the ends of the sheet as in recording and reproducing apparatus heretofore known.

Those sprocket holes 31 which are adjacent the ends of the sheet are spaced a predetermined distance from such ends within certain desired tolerances. Similarly, the teeth 16 which are formed on the sprocket wheels 10 and 12 are spaced from one another within certain tolerances. Such tolerances can be controlled so that a sheet gap not exceeding approximately .0025 inch can be produced without appreciable difficulty. In this manner, it is possible to avoid overlapping of the ends of the sheet 30 and to reduce the gap therebetween substantially to a minimum so as to eliminate the undesirable audible effects which have heretofore been produced when the adjacent ends of a sheet recording medium are passed across a recording or reproducing head.

When the ends of the magnetic sheet 30 are butted in the manner described above, it is possible to provide the desired minimum sheet gap without attempting to manufacture the sheet to a length which is precisely equal to the circumference or peripheral length of the sheet-mounting member on which the sheet is wrapped. On the contrary, the length of the sheet together with the circumference or peripheral length of the member on which it is mounted can have a relatively substantial maximum combined tolerance, for example, on the order of approximately .0625 inch. Such a tolerance can be achieved without appreciable difficulty, and as mentioned above, the tolerances with respect to the spacing of the sprocket teeth 16 and the spacing of the sprocket holes 31 in the sheet from the ends thereof can also be achieved with relatively little difficulty. Thus, the present invention provides a wholly practical recording and reproducing device for use with a magnetic sheet medium which overcomes the significant disadvantages of prior art devices and is adapted for recording and reproducing music as well as dictated matter and the like.

As shown in FIGURE 1, the width of the sheet 30 must of course be approximately equal to the spacing of the two sprocket wheels 10 and 12, and the sprocket holes 31 in the sheet must be spaced in relation to the spacing of the sprocket teeth 16. In order to retain the sheet in proper position on the sprocket wheels, any suitable retaining means such as a pair of retainer strips 32 and 34 may be provided. Such retaining members may comprise rings which are moved axially over the sprocket wheels 10 and 12 to encompass the sheet 30 after the latter has been wrapped about the wheels.

A magnetic recording and reproducing head is indicated at 36, in this instance the head being mounted exterior to the sheet. A pair of fixed support arms 38 are secured to the stationary tubular housing member 18 so as to extend radially therefrom, and a backup roller 40 is supported on said arms by means of pins 41 which extend axially from the roller and project into apertures formed in the radially outer ends of the support arms. The head 36 is moved axially along a path which is parallel to the shaft 14 as the sprocket wheels 10 and 12 with the magnetic sheet 30 mounted thereon are rotated, whereby a spiral recording track may be recorded on the sheet 30 and may similarly be reproduced therefrom. The backup roller 40 is positioned adjacent the inside of the sheet immediately opposite the recording and reproducing head 36, as shown in FIGURE 2, so as to support the sheet for engagement with the head.

The head 36 may be driven across the sheet 30 by any suitable mechanism. For example, a recording and reproducing head assembly may be mounted on a feed screw (not shown) which is rotated to move the head transversely across the sheet. Such a feed screw may be driven from the main drive assembly such as from the idler pulley 24, or the feed screw may have a sprocket wheel or the like mounted thereon which is adapted to engage in corresponding sprocket holes (not shown) formed in the sheet 30 so that the sheet itself will drive the head. In the embodiment being described, there is a positive drive relationship between the sprocket wheels 10 and 12 and the sheet 30, and thus the head can be driven from the main drive mechanism without introducing any lack of correlation between movement of the sheet and movement of the head. Mechanisms for driving a recording and reproducing head by each of the foregoing methods are described more fully in our copending application Serial No. 195,665, filed May 11, 1962.

Since the sheet 30 must be of sufficient length to extend around the sprocket wheels 10 and 12 with its ends substantially butted against one another, it will be understood that due to permissible tolerances on the sheet and on the sprocket wheels, the sheet will normally be longer than the circumferences of the sprocket wheels. Accordingly, since the ends do not overlap, consideration must be given to avoiding formation of a wrinkle in the sheet as the sheet is moved across the head 36 upon rotation of the sprocket wheels. In this instance, formation of a wrinkle is avoided by the plurality of sprocket teeth 16 which extend around the entire periphery of the sprocket wheels, since the excess length of the sheet is distributed substantially uniformly between each of the several sprocket teeth. Thus, between any given pair of adjacent teeth 16 there is only a very small portion of the excess length to be accommodated, and formation of a wrinkle as the sheet is moved across the head is thereby prevented.

An alternative embodiment of the invention is illustrated in FIGURES 3 and 4. In this instance, a pair of retainer wheels or pulleys 44 are mounted in axially spaced relation on opposite ends of a shaft 46, and a similar pair of retainer wheels 48 (one of which is shown) are mounted on a parallel shaft 50 so as to be in alignment with the wheels 44. A pair of endless belts 52 are mounted on the four retainer wheels, each belt being mounted over a corresponding one of the wheels 44 and a corresponding one of the wheels 48, and being of a width approximately equal to that of the wheels. Motor drive means such as shown in FIGURE 1 or other suitable drive means is utilized to rotate the shaft 50 so as to drive the sheet-mounting belts through a continuous path on the retainer wheels. Each of the belts 52 is provided around its periphery with a plurality of equally spaced teeth 54. One series or row of aligned teeth 54 is provided on each belt so as to cooperate with the sprocket holes 31 in a sheet 30 in the manner described hereinabove in connection with the embodiment of FIGURES 1 and 2. Thus, a sheet 30 may be mounted on the belts 52 and positioned thereon over the sprocket teeth 54 in such a manner that the ends of the sheet are substantially butted against one another as at 30′, the excess length of the sheet being uniformly distributed around the belts between each of the plurality of teeth 54 as described earlier herein.

A recording and reproducing head 56 is adapted to be moved transversely across the moving sheet 30 for recording a spiral sound track on the sheet or for reproducing a recording therefrom, and in the embodiment being described the head is positioned inside the path of the sheet so as to operatively engage its inner surface. A back-up roller 58 is mounted exterior of the sheet 30 immediately opposite the head 56 so as to maintain the moving sheet in proper engagement with the head.

Still referring to FIGURES 3 and 4, a sprocket wheel 60 is positioned adjacent the interior of the moving sheet 30 and is adapted to cooperate with an additional series of sprocket holes 31′ which are formed in the sheet adjacent one side thereof in spaced relation to the holes 31 which cooperate with the belt teeth 54. The sprocket wheel 60 is thus adapted to be driven by the sheet 30. The wheel 60 may be associated with a feed screw (not shown) on which a recording and reproducing head assembly including the head 56 is mounted so as to move the head transversely across the sheet and assure correlation between the movement of the sheet and the movement of the head. As previously stated, a head drive mechanism of this type is fully described in our copending application Serial No. 195,665.

In order to assure that the sheet 30 is retained in proper position on the pair of toothed belts 52, any suitable retaining means such as a retainer or guide wall 62 is provided which extends substantially around the belts in closely spaced relation thereto. The retainer wall may comprise a pair of narrow retaining members as shown in FIGURE 1 which are moved axially over the sheet 30 after the latter is mounted on the belts, or if desired a single retainer wall extending the entire width of the sheet may be permanently positioned exterior of the belt and provided with openings to permit insertion and removal of a sheet and to permit the head 56 to engage the sheet.

FIGURES 5 and 6 show another modification of the invention wherein a sheet-mounting member comprises a pair of sprocket wheels 66 (one of which is shown) which are mounted at opposite ends of a shaft 68, and a second pair of sprocket wheels 70 which are similarly mounted at opposite ends of a parallel shaft 72. In this embodiment, a series or row of sheet positioning teeth 74 are provided around the circumference of each of the four sprocket wheels in substantially equally spaced relation, and a magnetic sheet 30 is wrapped around the two pairs of sprocket wheels and positioned thereon by the teeth 74 in such a manner as to maintain the ends of the sheet shown at 30′ in substantially butted relation. In other words, the two pairs of sprocket wheels 66 and 70 function in much the same manner as the single pair of larger diameter sprocket wheels of the embodiment of FIGURES 1 and 2, or as the toothed belts of the embodiment of FIGURES 3 and 4, in that the ends of the sheet 30 are held in butted relation and the excess length of the sheet is substantially uniformly distributed between the plurality of teeth 74 which encompass the sprocket wheels so as to prevent a wrinkle from forming when the sheet is drawn past a recording or reproducing head.

It will of course be understood that just as the teeth on the large diameter sprocket wheels of FIGURE 1 or on the toothed belts of FIGURE 3 are in fixed relation to one another, the sprocket wheels 66 on the shaft 68 of FIGURE 5 must be synchronized with the sprocket wheels 70 on the shaft 72, since the sheet 30 will be controlled by the sheet-positioning teeth 74 on both pairs of wheels simultaneously, and all of the teeth must be synchronized if the sheet is to be maintained in proper position with its ends butted and its excess length substantially evenly distributed. The two pairs of sprocket wheels 66 and 70 can be positively synchronized by means of a chain or gear drive or the like therebetween. In the illustrated embodiment, there is shown an intermediate pinion 76 which meshes with a pinion 78 formed on a sprocket wheel 66 and a pinion 80 formed on a corresponding sprocket wheel 70 so as to provide a positive relationship therebetween. FIGURE 6 shows the manner in which the pinion 78 is fixedly mounted on an end portion 82 of the shaft 68 so as to be disposed adjacent an associated sprocket wheel 66 in fixed relation thereto.

A friction drive wheel is shown at 84 in engagement with the magnetic sheet 30, a back-up wheel 86 being mounted at the opposite side of the sheet to maintain the latter in proper engagement with the drive wheel. As in the various embodiments described earlier herein, a recording and reproducing head shown at 88 is adapted to move transversely across the moving sheet 30. A back-up roller 90 is positioned on the opposite side of the sheet immediately opposite the head 88 to maintain the sheet in proper engagement therewith. Any suitable motor drive mechanism may be utilized to rotate the drive wheel 84, such as the drive system shown in FIGURE 1, or the drive mechanism illustrated in our above-mentioned copending application. Also, the head 88 may be driven transversely of the sheet from one of the sprocket wheels 66 or 70, since movement of such sprocket wheels is positively correlated with movement of the sheet 30.

In conjunction with the embodiment of FIGURES 5 and 6, as in the various other embodiments described hereinabove, it is desirable to provide suitable retaining means to guide the sheet 30 and maintain the same in proper position on the teeth formed on the two pairs of synchronized sprocket wheels 66 and 70. Accordingly, a retainer wall or the like 92 may be provided which will substantially enclose the mounted sheet 30, the retainer being positioned in closely spaced relation to the sheet so as to maintain the same in proper position. In this instance, a pair of additional retainer walls 94 and 95 are positioned interior of the sheet between the pairs of sprocket wheels 66 and 70 to provide proper support for the sheet as it moves from one sprocket wheel to another. The retaining means may either be axially movable over the sheet after the latter is mounted on the sprocket wheels, or it may be fixed in position and provided with openings (not shown) adapted to permit insertion and removal of a sheet and driving thereof. Our copending application Serial No. 195,665 describes such retaining means in greater detail and illustrates the manner in which a sheet may be inserted and removed through openings formed in an outer retainer wall.

Still another embodiment of the present invention is illustrated in FIGURE 7 where there is provided a sheet-mounting member comprising a pair of relatively large diameter sprocket wheels 96 (one of which is shown) which are mounted on opposite ends of a shaft 98 in axially spaced relation. In this instance, only two sheet-positioning sprocket teeth 100 are formed on each of the wheels 96. Such teeth are spaced apart in a predetermined manner and cooperate with corresponding sprocket holes 31 formed in predetermined positions adjacent the ends of a sheet 30 at opposite sides thereof to maintain the sheet ends in substantially butted relation as shown at 30′.

A recording and reproducing head is shown at 102 and a back-up roller 104 is mounted on the opposite side of the sheet 30 immediately opposite the head so as to maintain the sheet in proper engagement therewith. A friction drive roller 106 and a back-up roller 108 are provided to operatively engage the sheet 30 and rotate the sheet and sprocket wheels 96 to pull the sheet past the head 102 substantially as described in connection with the embodiment of FIGURE 5.

It is preferred that the drive roller 106 be driven in a counterclockwise direction as viewed in FIGURE 7 so as to pull the sheet 30 past the head. Such an arrangement produces a significant advantage and accounts for the fact that only two sprocket teeth 100 are required on each of the sprocket wheels 96. As is true with respect to each of the several embodiments described herein, the sheet 30 will normally be slightly longer than the periphery of the member on which it is wrapped, in this case the sprocket wheels 96, so that a certain amount of excess length of sheet must be controlled so as to avoid formation of a wrinkle when the sheet is moved across the head. However, in the embodiment of FIGURE 7 the sheet is pulled across the head 102 by the friction drive roller 106, and with such an arrangement there is no tendency for a wrinkle to form at the head. Accordingly, it is not necessary in this instance to provide a plurality of teeth around the entire circumference of the sprocket wheel, and only two teeth are needed on each wheel, such teeth being for the purpose of maintaining the ends of the sheet in substantially butted relation as shown at 30′.

The head 102 may be driven transversely of the moving sheet by one of the methods described earlier herein, preferably by using a sprocket wheel and feed screw arrangement such as described in connection with FIGURE 3. Also, there is shown an outer retainer wall 110 and an inner retainer wall 112 to guide the sheet 30 and maintain the same in proper position on the sprocket wheels. As described earlier herein, the outer retainer may be movable axially over the sheet after the latter is mounted on the sprocket wheels, or it may be stationary and have openings (not shown) provided therein to permit insertion and removal of a sheet.

A still further embodiment of the invention is illustrated in FIGURE 8 where there is shown a sheet-mounting member comprising a drum 114 made in two sections 114*a* and 114*b* which are connected by yieldable means such as compression springs 116 which tend to bias the drum sections away from one another. The drum 114 has a pair of adjacent sheet-positioning teeth 118 provided at each of its ends in predetermined spaced relation so that a sheet 30 may be wrapped thereon and its ends held in substantially butted relation at 30′ in the manner described in connection with the embodiment of FIGURE 7.

The drum 14 is rotated from its center to move the sheet 30 past a head 120 which is positioned for transverse movement across the outside of the moving sheet. A retainer is shown at 122 for maintaining the sheet 30 in proper position on the drum. It will be understood that any excess length of the sheet 30 is taken up due to the fact that the drum is expandable, and thus there is no tendency for a wrinkle to form as the drum is rotated to move the sheet past the head 120. The expandable drum 114 will be slightly out of round, but the variation from a cylindrical shape can be minimized sufficiently to avoid any effect on the operation of the apparatus.

While several embodiments of the apparatus of the present invention have been described hereinabove, it will be understood that they are each based on the concept of providing a magnetic sheet which is wrapped about a movable sheet-mounting member and held thereon by sheet-positioning pins or sprocket teeth or the like in such a manner that the ends of the sheet are substantially butted against one another. In each instance it is intended that the sheet will normally be slightly longer than the peripheral distance around the member on which the sheet is wrapped so as to assure that the ends of the sheet can be butted, and yet the sheet need not be made in precise lengths since means are provided for accommodating the excess length so as to prevent formation of a wrinkle when the sheet is passed across a recording or reproducing head.

In certain embodiments the excess length of the sheet is distributed substantially evenly between sprocket teeth or the like which are formed around substantially the entire periphery of the member on which the sheet is mounted, whereas in other embodiments the sheet is pulled past a recording and reproducing head in such a fashion that there is no tendency for a wrinkle to form, and in the latter instance it is only necessary to provide sprocket teeth or the like adjacent the ends of the sheet to maintain such ends in butted relation.

It will further be understood that the present invention includes a method for recording and reproducing sound on a magnetic medium in the form of a sheet which comprises wrapping a magnetic sheet about a movable member which has a peripheral length slightly less than the length of the sheet, securing the ends of the sheet to said member in such a fashion that the ends are in substantially butted relation, and then moving the sheet and the member on which it is mounted past a transversely moving record or reproducing head or the like.

The means for securing the ends of the sheet to the movable member have been described herein as "sheet-positioning teeth" or "sprocket teeth," but it will be understood that as used hereinabove and in the appended claims such terms are intended to include pins and pin-like projecting members which are formed on the movable member in predetermined fixed positions and project therefrom into corresponding apertures provided in the sheet for securing the ends of the sheet in a butting relation, and in certain instances for positioning the entire sheet in a predetermined manner so as to distribute the excess length thereof in a uniform manner.

In certain of the embodiments illustrated in the drawings, it will be seen that the recording and reproducing head is positioned to engage the exterior of the sheet, whereas in other embodiments the head is located inside the path of travel of the sheet and engages the inner surface thereof. It will be understood that in this respect the positioning of the head is optional, and it may be located either inside or outside the path of the sheet as is desired. It should also be noted that in all instances where a pair of sprocket wheels or the like are mounted in axial alignment at opposite ends of a shaft, the sprocket wheels must be positioned or synchronized relative to one another so as to be adapted to cooperate to control the position of a magnetic sheet which is wrapped thereon.

While we have illustrated certain preferred forms of our invention, it will be understood that various other forms of apparatus can be devised within the scope of the invention to carry out the present inventive teaching of butting the ends of a magnetic sheet by using sprocket teeth or pins or the like formed on a movable member which is adapted to carry the sheet past a recording or reproducing head. For example, a cylindrical drum having sprocket teeth formed thereon may be utilized rather than a pair of sprocket wheels mounted at opposite ends of a shaft. Also, various types of retaining means may be provided both inside and outside of the sheet to assist in maintaining the sheet properly mounted on the sprocket teeth, and of course various openings can be provided in the retainers to permit drive rollers, back-up rollers, and a recording or reproducing head to make this necessary contact with the sheet. Thus, we do not intend to be limited to the particular forms illustrated, except insofar as the appended claims are so limited, since modifications coming within the scope of our invention will be readily suggested to others with our disclosure before them.

We claim:

1. In a magnetic recording or reproducing device of the type which is adapted for use with a record medium in the form of a sheet of magnetic material and which has a head member adapted to be moved transversely across a moving sheet, the improvement comprising a movable sheet-mounting member adapted to permit a sheet of magnetic material of a length normally exceeding the peripheral length of said mounting member to be wrapped thereon, a plurality of sheet-positioning teeth fixed to said mounting member in predetermined spaced relation and adapted to project through corresponding apertures adjacent the ends of a sheet which is wrapped thereon for holding the ends of the sheet in a substantially butted relationship which is independent of the precise length of the sheet, and a friction drive roller adapted to operatively engage against a record sheet which is mounted on said sheet-mounting member to drive the latter and pull the sheet past said head member.

2. In a magnetic recording or reproducing device of the type which is adapted for use with a record medium in the form of a sheet of magnetic material and which has a head member adapted to be moved transversely across a moving sheet, the improvement comprising a rotatable sheet-mounting member adapted to permit a sheet of magnetic material of a length normally exceeding the circumference of said mounting member to be wrapped thereon, at least two pairs of adjacent sheet-positioning teeth fixed to said mounting member in predetermined spaced relation, one pair at each end thereof, and adapted to project through corresponding apertures adjacent the ends and near the side edges of a sheet which is wrapped thereon for holding the ends of a sheet in a substantially butted relationship which is independent of the precise length of the sheet, and a friction drive roller mounted adjacent said mounting member and adapted to operatively engage against a record sheet which is mounted on said member to rotate said mounting member and pull the sheet past said head member.

3. In a magnetic recording or reproducing device of the type which is adapted for use with a record medium in the form of a sheet of magnetic material and which has a head member adapted to be moved transversely across a moving sheet, the improvement comprising a movable sheet-mounting member adapted to permit a sheet of magnetic material of a length normally exceeding the peripheral length of said mounting member to be wrapped thereon, a plurality of sheet-positioning teeth formed in spaced relation around substantially the entire peripheral length of said member at each end thereof and adapted to project through corresponding apertures in a sheet which is wrapped thereon for holding the ends of the sheet in a substantially butted relationship which is independent of the precise length of the sheet and for substantially uniformly distributing the excess length of the sheet between the several teeth around the periphery of said member, and means for driving said member so as to transport the sheet past said head member.

4. In a magnetic recording or reproducing device of the type which is adapted for use with a record medium in the form of a sheet of magnetic material and which has a head member adapted to be moved transversely across a moving sheet, the improvement comprising a pair of sprocket wheels mounted at opposite ends of a rotatable shaft and adapted to permit a sheet of magnetic material of a length normally exceeding the circumference of said sprocket wheels to be wrapped thereon, a plurality of sheet-positioning teeth formed on each of said sprocket wheels in predetermined spaced relation and adapted to project through corresponding apertures and adjacent the ends of a sheet which is wrapped thereon for holding the ends of the sheet in a substantially butted relationship which is independent of the precise length of the sheet, drive means for driving said sprocket wheels so as to transport said sheet past said head member, and means for supporting said sheet against said head member.

5. In a magnetic recording or reproducing device of the type which is adapted for use with a record medium in the form of a sheet of magnetic material and which has a head member adapted to be moved transversely across a moving sheet, the improvement comprising a pair of sprocket wheels mounted at opposite ends of a rotatable shaft and adapted to permit a sheet of magnetic material of a length normally exceeding the circumference of said sprocket wheels to be wrapped thereon, a pair of adjacent sheet-positioning teeth formed on each of said sprocket wheels in predetermined spaced relation and adapted to project through corresponding apertures adjacent the ends of a sheet which is wrapped thereon for holding the ends of a sheet in a substantially butted relationship which is independent of the precise length of the sheet, and a friction drive roller and associated back-up means adapted to operatively engage against a record sheet which is mounted on said member to rotate said sprocket wheels and pull the sheet past said head member whereby such pulling of the sheet will eliminate any tendency of the excess length thereof to form a wrinkle as the sheet moves across said head member.

6. In a magnetic recording or reproducing device of the type which is adapted for use with a record medium in the form of a sheet of magnetic material and which has a head member adapted to be moved transversely across a moving sheet, the improvement comprising a pair of sprocket wheels mounted at opposite ends of a rotatable shaft and adapted to permit a sheet of magnetic material of a length normally exceeding the circumference of said sprocket wheels to be wrapped thereon, a plurality of sheet-positioning teeth formed in spaced relation around substantially the entire circumference of each of said sprocket wheels and adapted for project through corresponding apertures in a sheet which is wrapped thereon for holding the ends of the sheet in a substantially butted relationship which is independent of the precise length of the sheet and for substantially uniformly distributing the excess length of the sheet between the several teeth around the circumference of said wheels, and means for rotating said shaft so as to rotate said sprocket wheels and transport the sheet past said head member.

7. In a magnetic recording or reproducing device of the type which is adapted for use with a record medium in the form of a sheet of magnetic material and which has a head member adapted to be moved transversely across a moving sheet, the improvement comprising an endless belt mounted on a plurality of rotatable belt retainer wheels and adapted to permit a sheet of magnetic material of a length normally exceeding the peripheral length of the belt to be wrapped thereon, a plurality of sheet-positioning teeth formed in spaced relation on said belt around substantially the entire length thereof and adapted to project through corresponding apertures in a sheet which is wrapped thereon for holding the ends of the sheet in a substantially butted relationship which is independent of the precise length of the sheet and for distributing the excess length of the sheet substantially uniformly between the several teeth on said belt, and means for driving said belt so as to transport said sheet past said head member.

8. In a magnetic recording or reproducing device of the type which is adapted for use with a record medium in the form of a sheet of magnetic material and which has a head member adapted to be moved transversely across a moving sheet, the improvement comprising a rotatably mounted expandable drum adapted to permit a sheet of magnetic material of a length normally exceeding the minimum circumference of said drum to be wrapped thereon, a pair of adjacent sheet-positioning teeth fixed to each end of said drum in predetermined spaced relation and adapted to project through corresponding apertures adjacent the ends of a sheet which is wrapped thereon for holding the ends of the sheet in a substantially butted relationship which is independent of the precise length of the sheet, the excess length of the sheet being taken up through expansion of said drum, and means for rotating said drum to transport the sheet past said head member.

9. In a magnetic recording or reproducing device of the type having a head member adapted to be moved transversely across a moving sheet, the improvement comprising, in combination, a movable sheet-mounting member having a plurality of sheet-positioning members fixed thereto in predetermined spaced relation so as to project through corresponding apertures in a sheet which is wrapped thereon, a sheet of magnetic material of a length normally exceeding the peripheral length of said mounting member and having a plurality of apertures adjacent the ends of the sheet and spaced a predetermined distance from said ends, said sheet being removably wrapped on said mounting member for recording or reproducing therefrom and being retained in position on said mounting member by said sheet-positioning members with said ends of said sheet in a substantially butted relationship which is independent of the precise length of the sheet, and drive means for driving said sheet-mounting member so as to transport said sheet past said head member.

10. In a magnetic recording or reproducing device of the type having a head member adapted to be moved transversely across a moving sheet, the improvement comprising, in combination, a rotatable sheet mounting member having at least two pairs of sheet-positioning teeth fixed thereto in predetermined spaced relation, one pair at each end thereof, so as to project through corresponding apertures in a sheet which is wrapped thereon, a sheet of magnetic material of a length normally exceeding the circumference of said mounting member and having a plurality of apertures near the side edges of said sheet adjacent the ends thereof and spaced a predetermined distance from said ends, said sheet being removably wrapped on said mounting member for recording thereon or reproducing therefrom and being retained in position on said mounting member by said sheet-positioning teeth with the ends of said sheet in a substantially butted relationship which independent of the precise length of the sheet, and a friction drive roller adapted to operatively engage against said sheet when the latter is wrapped on said mounting member so as to rotate said mounting member and pull said sheet past said head member.

11. In a magnetic recording or reproducing device of the type having a head member adapted to be moved transversely across a moving sheet, the improvement comprising, in combination, a movable sheet-mounting member having a plurality of sheet-positioning teeth formed in spaced relation around substantially the entire peripheral length of said member at each end thereof so as to project through corresponding apertures in a sheet which is wrapped thereon, a sheet of magnetic material of a length normally exceeding the peripheral length of said mounting member and having a plurality of apertures in predetermined spaced relation near the side edges thereof, said sheet being removably wrapped on said mounting member for recording thereon or reproducing therefrom and being retained in position on said mounting member by said sheet-positioning teeth with the ends of said sheet in a substantially butted relationship which is independent of the precise length of said sheet and with the excess length of said sheet being substantially uniformly distributed between said plurality of teeth around the periphery of said member, and means for driving said member so as to transport said sheet past said head member.

12. In a magnetic recording or reproducing device of the type having a head member adapted to be moved transversely across a moving sheet, the improvement comprising, in combination, a pair of sprocket wheels mounted at opposite ends of a rotatable shaft, each of said wheels having a plurality of sheet-positioning teeth formed thereon in predetermined spaced relation so as to project through corresponding apertures in a sheet which is wrapped thereon, a sheet of magnetic material of a length normally exceeding the circumference of said sprocket wheels and having a plurality of apertures near the side edges of said sheet adjacent the ends thereof and spaced a predetermined distance from said ends, said sheet being removably wrapped on said sprocket wheels for recording thereon or reproducing therefrom and being retained in position on said mounting member by said sheet-positioning teeth with the ends of said sheet in a substantially butted relationship which is independent of the precise length of the sheet, drive means for driving said sprocket wheels so as to transport said sheet past said head member, and means for supporting said sheet against said head member.

13. In a magnetic recording or reproducing device of the type having a head member adapted to be moved transversely across a moving sheet, the improvement comprising, in combination, a pair of sprocket wheels mounted at opposite ends of a rotatable shaft, each of said wheels having a pair of adjacent sheet-positioning teeth formed thereon in predetermined spaced relation so as to project through corresponding apertures in a sheet which is wrapped thereon, a sheet of magnetic material of a length normally exceeding the circumference of said sprocket wheels and having two pairs of apertures near the side edges of said sheet adjacent the respective ends thereof in predetermined spaced relation to said ends, said sheet being removably wrapped on said sprocket wheels for recording thereon or reproducing therefrom and being retained in position on said mounting member by said sheet-positioning teeth with the ends of said sheet in a subtsantially butted relationship which is independent of the precise length of said sheet, and a friction drive roller and associated back-up means adapted to operatively engage against a record sheet which is mounted on said member to rotate said sprocket wheels and pull the sheet past said head whereby such pulling of the sheet will eliminate any tendency of the excess length thereof to form a wrinkle as the sheet moves across said head member.

14. In a magnetic recording or reproducing device of the type having a head member adapted to be moved transversely across a moving sheet, the improvement comprising, in combination, a pair of sprocket wheels mounted at opposite ends of a rotatable shaft, each of said wheels having a plurality of sheet positioning teeth formed in spaced relation around substantially the entire circumference thereof so as to project through corresponding apertures in a sheet which is wrapped thereon, a sheet of magnetic material of a length normally exceeding the circumference of said sprocket wheels and having a plurality of apertures in predetermined spaced relation near the side edges thereof, said sheet being removably wrapped on said sprocket wheels for recording thereon or reproducing therefrom and being retained in position on said mounting member by said sheet-positioning teeth with the ends of said sheet in a substantially butted relationship which is independent of the precise length of said sheet and with the excess length of said sheet being substantially uniformly distributed between said plurality of teeth around the circumference of said wheels, and means for rotating said shaft so as to rotate said sprocket wheels and transport said sheet past said head member.

15. A method of recording or reproducing sound with a magnetic medium in the form of a sheet which method comprises the steps of wrapping a sheet of magnetic material on a movable member which has a peripheral length slightly less than the length of said sheet, securing the ends of the sheet to the movable member in such a manner that said ends are in a substantially butted relationship, and driving said movable member so as to continuously transport said sheet past recording or reproducing means.

16. A method of recording or reproducing sound with a magnetic medium in the form of a sheet which method comprises the steps of wrapping a sheet of magnetic material on a movable member which has a peripheral length slightly less than the length of said sheet, securing the ends of the sheet to the movable member in such a manner that said ends are in a substantially butted relationship, and engaging said sheet with a movable drive member so as to pull said sheet past recording or reproducing means whereby such pulling of the sheet will eliminate any tendency of the excess length thereof to form a wrinkle as the sheet moves across said recording or reproducing means.

17. A method of recording or reproducing sounds with a magnetic medium in the form of a sheet which method comprises the steps of wrapping a sheet of magnetic material on a movable member which has a peripheral length slightly less than the length of said sheet, securing the ends of the sheet to the movable member in such a manner that said ends are in a substantially butted relationship, securing the remainder of said sheet to said movable member so as to distribute the excess length of said sheet substantially uniformly around the periphery of said movable member, and driving said movable member so as to continuously transport said sheet past recording or reproducing means.

18. A method of recording or reproducing sounds with a magnetic medium in the form of a sheet which method comprises the steps of wrapping a sheet of magnetic material on a movable member which has a peripheral length slightly less than the length of said sheet, securing the ends of the sheet to the movable member in such a manner that said ends are in a substantially butted relationship, engaging said sheet with a movable drive member so as to pull said sheet past recording or reproducing means whereby such pulling of the sheet will eliminate any tendency of the excess length thereof to form a wrinkle as the sheet moves across said recording or reproducing means, and driving said recording or reproducing means from said sheet so as to move said means transversely of the sheet at a speed which is correlated with the movement of said sheet.

19. In a magnetic recording or reproducing device of the type having a head member adapted to be moved transversely across a moving sheet, the improvement comprising, in combination, a movable sheet-mounting member having a plurality of sheet-positioning teeth fixed thereto in predetermined spaced relation so as to project through corresponding apertures in a sheet which is wrapped thereon, a sheet of magnetic material of a length normally exceeding the peripheral length of said mounting member and having a plurality of apertures adjacent the ends of the sheet and spaced a predetermined distance from said ends, said sheet being removably wrapped on said mounting member for recording thereon or reproducing therefrom and being retained in position on said mounting member by said sheet-positioning teeth with said ends of said sheet in a substantially butted relationship which is independent of the precise length of the sheet, and drive means for driving said sheet-mounting member so as to transport said sheet past said head member.

References Cited by the Examiner

UNITED STATES PATENTS 3,089,705 5/1963 Fritzinger ----------- 274—17

NORTON ANSHER, *Primary Examiner.*

UNITED STATES PATENT OFFICE
CERTIFICATE OF CORRECTION

Patent No. 3,218,077 November 16, 1965

James L. D. Morrison et al.

It is hereby certified that error appears in the above numbered patent requiring correction and that the said Letters Patent should read as corrected below.

Column 10, line 56, for "for project" read -- to project --; column 11, line 38, after "recording" insert -- thereon --; column 12, line 50, for "removally" read -- removably --.

Signed and sealed this 2nd day of August 1966.

(SEAL)
Attest:

ERNEST W. SWIDER
Attesting Officer

EDWARD J. BRENNER
Commissioner of Patents